WILLIAM BELL.
Improvement in Railway Cars.

No. 123,610. Patented Feb. 13, 1872.

Witnesses:
James H. Hunter
A B Malcomson

Inventor:
Wm Bell 123,610

UNITED STATES PATENT OFFICE.

WILLIAM BELL, OF PERTH AMBOY, NEW JERSEY.

IMPROVEMENT IN RAILWAY CARS.

Specification forming part of Letters Patent No. 123,610, dated February 13, 1872.

*To all whom it may concern:*

Be it known that I, WILLIAM BELL, of Perth Amboy, in the State of New Jersey, have invented a new and useful Improvement in Cars; and hereby declare that the following is a full and clear description of the same, reference being had to the accompanying drawing, in which—

Figure 1:
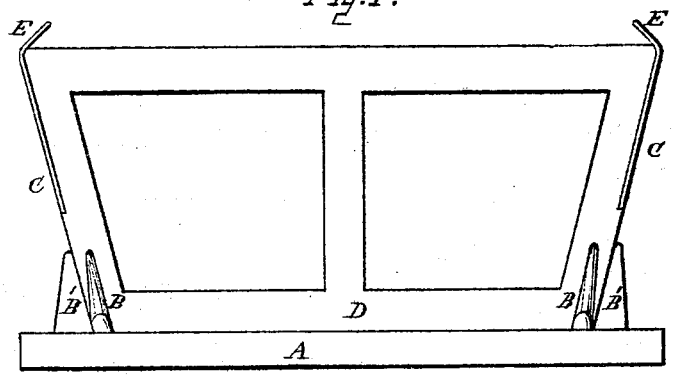
Figure 2:
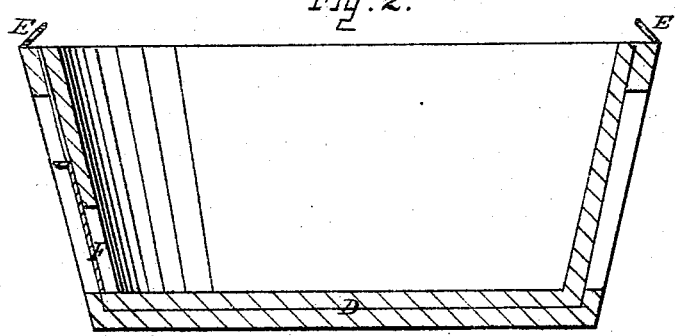
Figure 3:
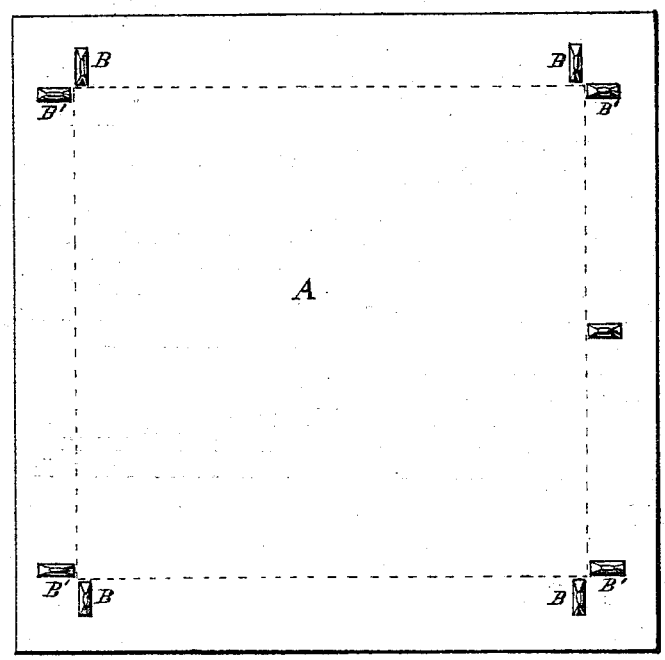

Figure 1 is a side view of top of a truck and car-body embodying my improvement. Fig. 2 is a longitudinal vertical section of the car-body removed from its truck. Fig. 3 is a plan view of the floor of the truck with the car-body removed.

This invention has reference to a removable car-body, so that freight may be transported over railroads varying in gauge without breaking bulk. By reason of it the car-body is capable of being conveniently transferred, detached from its truck, to a vessel for transportation over water, and thereby admitting of a connection with other lines of railroads, either of the same or a different gauge, without handling in transit the contents of such car. It also permits of the car-body being transported, with its contents undisturbed, on city drays, to a warehouse. The car-bodies, after they have been unloaded, can, by reason of this improvement, be more readily and economically returned to their place of destination. It admits of the use of a less number of trucks on a railroad, and hence reduces the cost of rolling-stock, as a small number of such trucks can be in use transporting car-bodies while car-bodies previously transported by such trucks have not yet been unloaded or are yet being transported on vessels or on drays to their ultimate place of destination.

In the drawing, which serves to illustrate my invention, A is the floor of a truck, upon which are constructed four double supports, B B', &c., for the purpose of retaining the four corners of the car-body in a rigid manner. C C, &c., are the four sides of a car-body, having a bottom, D, independent of the floor of the truck.

In order that the car-bodies may nest or pack one within another, so as to return several up-on one truck, the shape of the sides of each is such that they make an obtuse angle with its bottom, instead of being at right angles thereto, as seen in the drawing.

E E, &c., are rings, one placed at each corner of the car-body, in order that the hooks attached to the chains of a crane may be connected therewith, in order to readily shift the car-body from one point to another. F is an opening for discharging freight, such as coal or grain. This opening may be made in any convenient manner.

Claims.

1. A removable car-body, constructed in the form as shown, with inclined sides, arranged and combined with the platform of the car adapted to receive and hold it, as and for the purpose set forth.

2. The supports B B', &c., on the platform A, at the corners, for retaining the said body in position, as set forth.

WM. BELL.

Witnesses:
JAMES H. HUNTER,
A. B. MALCOMSON, Jr.